(12) United States Patent
Kalfhaus

(10) Patent No.: US 7,208,922 B2
(45) Date of Patent: Apr. 24, 2007

(54) VOLTAGE REGENERATOR

(76) Inventor: Reinhard Kalfhaus, Jahnstrasse 2, 63533 Mainhausen (DE)

( * ) Notice: Subject to any disclaimer, the term of this patent is extended or adjusted under 35 U.S.C. 154(b) by 0 days.

(21) Appl. No.: 11/219,804

(22) Filed: Sep. 7, 2005

(65) Prior Publication Data

US 2006/0049904 A1    Mar. 9, 2006

(30) Foreign Application Priority Data

Sep. 7, 2004    (DE) .................... 10 2004 043 609

(51) Int. Cl.
*G05F 1/613* (2006.01)
*G05F 1/585* (2006.01)

(52) U.S. Cl. .................... 323/222; 323/282; 363/124
(58) Field of Classification Search ........ 323/222–225, 323/265, 268, 271, 282, 351, 124
See application file for complete search history.

(56) References Cited

U.S. PATENT DOCUMENTS

| 4,823,247 A | * | 4/1989 | Tamoto ........................ 363/16 |
| 5,499,178 A | * | 3/1996 | Mohan ........................ 363/39 |
| 5,574,635 A | * | 11/1996 | Philippe ...................... 363/124 |
| 5,932,995 A | | 8/1999 | Wagoner |
| 6,404,655 B1 | * | 6/2002 | Welches ...................... 363/41 |

FOREIGN PATENT DOCUMENTS

| DE | 2111222 | 9/1972 |
| DE | 19515210 | 10/1996 |

* cited by examiner

*Primary Examiner*—Gary L Laxton
(74) *Attorney, Agent, or Firm*—Dennison, Schultz & Macdonald

(57) ABSTRACT

The invention focuses on a voltage transformer (VT) that includes at least two transformer stages (VT I, VT II), each of them with an input connection and to each of which an input subvoltage $U_{EI}$, $U_{EII}$ is attached and added together they form an input voltage $U_E$, and each of them with an outlet connection where an output subvoltage $U_{AI}$, $U_{AII}$ is attached to each outlet, the total forming an output voltage $U_A$. In order to prove that a concentration of electrical power of several stages is possible with or without a transformer, as well as to improve the efficiency and lower the cost, it is planned to attach a positive output subvoltage $U_{AI}$ at the first outlet of the transformer stage (VT I) with reference to a ground potential (P) and to attach a negative output subvoltage $U_{AII}$ with reference to this ground potential (P) at the outlet of the second transformer stage (VT II), whereby the sum of the individual output subvoltages $U_{AI}$, $U_{AII}$ is the output voltage $U_A$.

10 Claims, 2 Drawing Sheets

VOLTAGE REGENERATOR

BACKGROUND OF THE INVENTION

The invention concerns a voltage transformer.

The switching alignment of a dual buck converter with connected choking coils is familiar from U.S. Pat. No. 5,932,995. This is used to lower an alternating high input voltage without a ground potential to a controlled output voltage. For this purpose the plan is to connect the choking coils of two independent buck converters. The input voltage is thereby fed through the input connectors of two buck converters, with the result that the common potential is made symmetrical through linkage of the choking coils and simultaneous switching of the switching devices. Customary switching alignments involve a buck converter whose output voltage is constantly lower than the input voltage.

From DE-A-195 15 210 we know that part of the switching network is designed for the regeneration of an input voltage loaded with alternations that fits in an input circuit in the form of a SEPIC topology. The switching alignment involves a buck-boost converter.

DE-A-2 111 222 is concerned with symmetrical switching for externally activated transistor-direct current converters through the use of an analog-digital transformer for the pulse-width control of the signal transistors. This is designed to create a measuring circuit voltage with polarity dependent on the symmetry of the impulse currents by the currents transmitted in isolated primary coils of the converter by means of the current transformer and a common integrated switching mechanism. As a result of the voltage the controlling rectangle alternating voltage delivered by a synchronizing pulse generator through a measurement transformer to the analog digital transformer at the measurement transformer output in the sense of a pulse width control is influenced. The currents will thereby become symmetrical.

In DE A-198 00 105 there is an electrical current voltage transformer that is especially well known for high input voltages. This contains a primary side, which displays several sequentially switched partial systems, each one of which has at least one transistor circuit breaker and its own assigned transformer coil, as well as a secondary side through which the subsystems are linked to a common load output. In addition, the semiconductors of the primary or input stage are symmetrically loaded according to voltage, while the semiconductor voltage load corresponds to the input voltage segmented by the number of subsystems plus the inter-circuit voltage that fits on the primary side of the transformer. Thanks to the transformer, a collective bunching of the single-stage outputs is achieved in a common output.

SUMMARY OF THE INVENTION

Proceeding from this, the invention under consideration has the basic problem of developing an electrical voltage transformer of the kind that is mentioned in the introduction so that an output concentration of several stages is possible with or without a transformer, the purpose being to improve efficiency and lower the cost.

The switching alignment contained in the invention will achieve the goal of an input voltage that by way of example can have voltage limits of 450 V at the lower end and 1500 V at the upper end and that is smaller, equal to, and larger than the output or inter-circuit voltage that is produced. It will be made available in such a way that its total output is larger in combination with the input voltage than the maximum semiconductor voltage of the semiconductor devices (transistors/diodes) that are used. As a result semiconductors can be used whose quality of switching performance is more efficient and of optimal cost. The switching alignment offers the further advantage that the collective, concentrated voltage output is twice as great as the inter-circuit voltage and is available without potential isolation.

The voltage transformer projected by the invention can be termed a "double regenerator." It consists of a first subsystem that displays a positive output subvoltage related to a ground potential and a second subsystem that produces a negative output subvoltage related to this ground potential. The output voltage is based on the sum of the individual output subvoltages.

In order to achieve an improved standard of symmetry in the individual transformer stages, it is planned in accordance with preferable further development that the inductances developed as choking coils demonstrate a collective magnetic core.

Since the reference potential designated as ground potential is a statistical potential that constantly corresponds to half the input voltage and half of the output voltage, a controlling/regulating activation switch controller for the voltage transformer will preferably be placed on this potential.

Electrometry is generated in the preferred manner in each of the shunt branches shown for the shunt inductances by a shunt measurement or an electrical power sensor in the form of a power transformer whose individual measurements can be added to a current value, or a lack of symmetry in the currents can be discovered.

With reference to this ground potential, the input voltage will be called upon for the derivative of the $t_{on}$ time by means of a simple differential operational amplifier, and likewise by way of a differential operational amplifier, the output voltage will be drawn upon for the derivative of the actual-value controlled variable.

The semiconductor devices in the shunt branches have a control up to undefined potential with at least one switching device, as a result of which a control unit with potential-free control and 0–360° control will be used.

As the reference potential is for ground potential, that is, for half the input voltage, the benefit of reduced airways and crawl spaces will be gained.

In the preferred implementation form the semiconductor devices are developed as IGBT or FET transistors.

BRIEF DESCRIPTION OF THE DRAWINGS

Further details, benefits, and hallmarks of the invention are revealed not only in the claims and in the features one can derive from them—alone and/or in combination—but also in the following description of favorable implementation examples.

Shown in.

DESCRIPTION OF THE PREFERRED EMBODIMENTS

Figure 1:
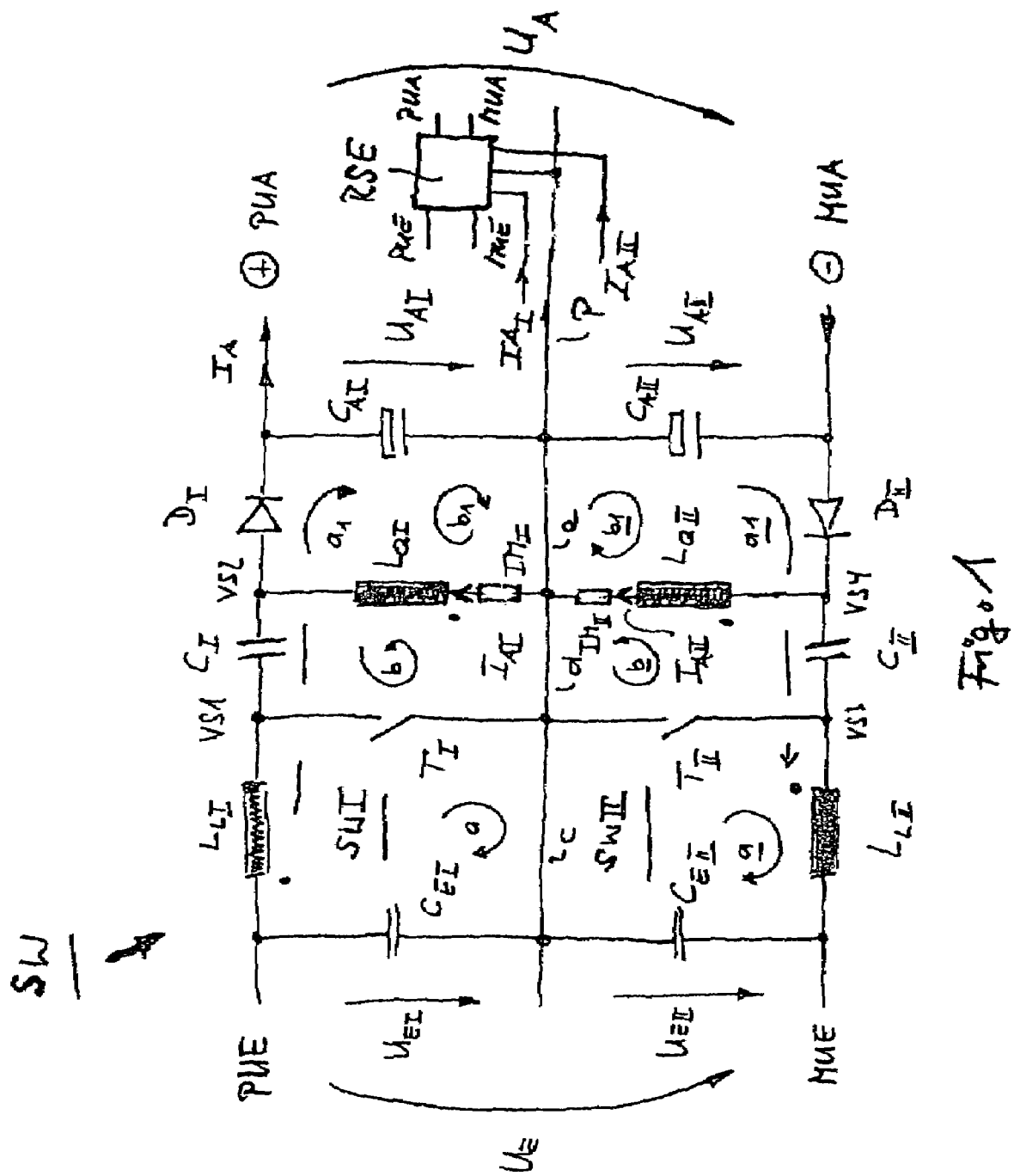
FIG. 1 One form of implementation of a double SEPIC transformer.

FIG. 1 shows a model wiring diagram of a two-stage voltage transformer VT, which also can be termed a double regenerator. Voltage transformer VT consists of at least two transformer stages, VT I and VT II, each of which presents a SEPIC or modified topology. In addition a subvoltage $U_{EI}$ of the input voltage $U_E$ is attached to the first transformer stage VT I, which, with reference to common potential P (ground potential) produces a positive output subvoltage $U_{AI}$ at the discharge point of transformer stage VT I. Moreover, a second transformer stage VT II is planned, which, from subvoltage $U_{EII}$ of input voltage $U_E$, produces a negative output voltage $-U_{AII}$ with reference to common potential P. Thus by switching transformer stages VT I and VT II on the output side, output voltage $U_A$ as the sum of output subvoltages $U_{AI}$, and $U_{AII}$ is available.

The first transformer stage VT I includes a shunt branch, proceeding from input terminal PUE, that displays an inductance coil $L_{II}$, capacitor $C_1$, as well as diode $C_{AII}$. Input terminal PUE of the first transformer state VT I is connected to a junction of inductance coil $L_{LI}$ as well as to the first pole of capacitor $C_{E1}$, the second pole of which is connected to common potential P. Subvoltage $U_{EI}$ of input voltage $U_E$ is attached to capacitor $C_{EI}$. Junction VS1 between inductance coil $L_{LI}$ and capacitor $C_1$ is connected by way of semiconductor $T_1$ with common potential P. Junction VS2 lies between capacitor $C_1$ and an anode of diode $D_1$ by way of inductance coil $L_{QI}$ and current measurement device $IM_1$ at common potential P. A cathode of diode $D_1$ is connected with positive output PUA and a positive pole of output capacitor $C_{AI}$, whose negative pole is connected with common potential P. Output subvoltage $U_{AI}$ of output voltage $U_A$ is attached at capacitor $C_{AI}$.

The second transformer stage VT II includes a horizontal branch, issuing from input terminal MUE, which shows an inductance coil $L_{LII}$, a capacitor $C_{1I}$, and a diode $D_{1I}$. Input terminal MUE of the second transformer stage VT II is connected with a terminal of inductance coil $L_{LII}$, as well as with a first pole of capacitor $C_{EII}$, the second pole of which is connected to common potential P. Subvoltage $U_{EII}$ of input voltage $U_E$ is attached to capacitor $C_{EII}$. Junction VS3 between inductance coil $L_{LII}$ and capacitor $C_{1I}$ is connected to common potential P by way of semiconductor device $T_{II}$. Junction VS4 between capacitor $C_{1I}$ and a cathode of diode $D_{1I}$ is located by way of inductance coil $L_{QII}$ and current measurement device $IM_{1I}$ at common potential P. An anode of diode $D_{1I}$ is connected to negative output MUA and a negative pole of output capacitor $C_{AII}$, the positive pole of which is linked with common potential P. Output subvoltage $U_{AII}$ of output voltage $U_A$ is attached at capacitor $C_{AII}$.

The voltage transformer VT for upgraded input voltages $U_E$ is primarily structured for the electronic systems business (inverters/battery load systems/AC converters) at 600–750 VDC and 1000 V AC, for example, whereas with input voltage $U_E$, a voltage in the range of $400 \pm U_E \pm 1500$ V is available. This holds for the contemporary state of semiconductor technology, but it can surely be applied to all other rated voltages.

The topology described above leads to the conclusion that from input voltage $U_E$, which is smaller, equal or larger than an output voltage $U_A$ or an inter-circuit voltage to be constructed, an output voltage is produced which in its totality with the input voltage $U_E$ plus a transient voltage $U_{TRANS}$ is greater than the electric strength of semiconductor devices TI, TII, DI, and DII of the individual branches.

In the voltage transformer VT business—for example, in a railway power network—one must deal with transient voltages in the range of $U_{TRANS} \approx 2000$ V. Given the known switching topologies in the current state of technology, semiconductor devices with electrical strengths of more than 2000 V would therefore have to be used. In the case before us, an input voltage $U_E$ in the range of 450 to 1500 V and 660 V output voltage at semiconductor devices TI or TII with symmetrical activation of transformer stages VTI, VTII 750 V+330 V is attached, that is, half of the total input and output voltages (1500 V+660 V)÷2=1080 V. By switching off the power level when transients begin, these can amount to a doubling of the voltage of individual switching devices when UL plus transient voltages are present. The result is that semiconductor devices can be installed which in their electrical strength are below the voltage levels produced by input voltage and transient voltage. These semiconductor devices have a quicker switching response, are smaller in size, and are less costly.

Given a synchronized activation (identical extent of voltage time) of semiconductors TI and TII, the shunt branch creating common potential P is bereft of power. Only in the case of a synchronized inequality or, as the case may be, a time-staggered activation of shunt current flows a, $\underline{a}$, b, $\underline{b}$ in the shunts of voltage transformer stages VTI or VTII do currents flow over shunts c, d, and e. When activation is symmetrical, the shunt currents are also identical, i.e., a=$\underline{a}$, a1=$\underline{a1}$, b=$\underline{b}$, and b1=$\underline{b1}$.

Since the semiconductor switching devices, in particular semiconductor transistors like IGBT or FET transistors, have varying reference potentials, activation of at least one transistor T1 and TII by means of potential-free 0°–360° activation must occur.

Electrometry in the shunt inductance coils LQI, LQII is preferably accomplished by shunt resistance or by potential-free current transformers such as LEM transformers (LEM registered trademark). This current corresponds to current $I_A$.

Input subvoltages $U_{EI}$ and $U_{EI}$, in accordance with the topology of the invention, are 50% lower, i.e., at input voltage $U_E$ in the area of 450 to 1500 V $U_{EI}$ and $U_{EII}$ are in the area of 225 to 750 V. Thus very fast and less expensive semiconductors with a maximum voltage in the area of 1200 V can be installed.

Furthermore, a "tangible" output voltage of, for example, $U_A$=660 V is available at the output point, in which case, provided that common potential P, given synchronized (simultaneous/staggered) activation, is symmetrical at half the input voltage, that is to say at output voltage $U_A$.

As an alternative to the form of implementation represented in FIG. 1, a pulsating alternating voltage, as is common in 1000 V/16 ⅓ Hz and 1500 V/50 Hz networks in railway technology, can be used. In this case the DC-DC converter VT can be activated with a PFC control circuit, which is described as an example in DE 195 05 417 A1.

In the switching alignment described above it is unimportant whether the installed input voltage at hand is one with DC voltage or with AC voltage with preferably 16.3/50/60 or 400 Hz sinusoid, trapezoid, or rectangle voltage.

The control unit (CU) is located in potential P and for measurement of the output voltage is connected to PUA and MUA. For control of the $t_{on}$ time, input voltage PUE and PUM are measured. In addition junctions for current measurement $I_{AI}$ and $I_{AII}$, are provided by the shunt voltages.

Figure 2:
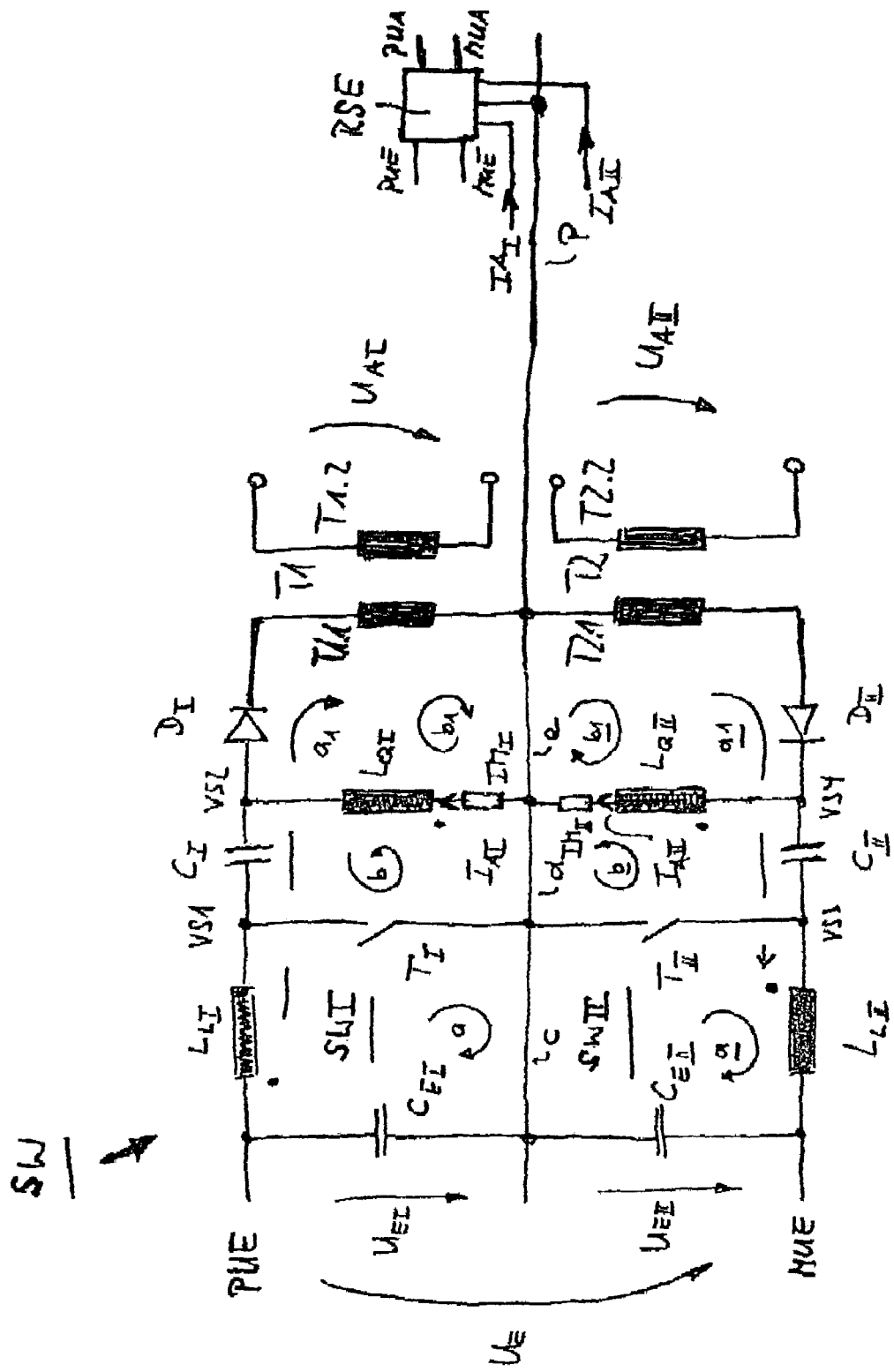
FIG. 2 A second form of implementation of the double SEPIC transformer with potential isolation.

FIG. 2 shows an additional implementation form of the double SEPIC transformer with potential isolation whereby output capacitors $C_{AI}$ and $C_{AII}$ are each replaced by a primary coil T1.1 or T2.1 of an isolation transformer T1, T2. In addition, each secondary coil T1.2, T2.2 has output subvoltage $U_{AI}$ or $U_{AII}$ attached. On the output side, secondary coils T1.2, T2.2 can each be switched sequentially or in parallel form according to current or voltage needs, whereby output stages VT1 and VTII occur symmetrically.

The invention claimed is:

1. Voltage regenerator (VT) including at least a first regenerator stage ($VT_I$) and a second regenerator stage ($VT_{II}$), each said regenerator stage having an input connection, with a first input subvoltage ($U_{EI}$) and a second input subvoltage ($U_{EII}$), respectively, attached at each input connection, and which added together form an input voltage $U_E$, said first and second regenerator stages having first and second output connections, respectively, whereby at the first output connection of the first regenerator stage, with reference to a common potential (P), there is a positive output subvoltage ($U_{AI}$), and at the second output connection of the second regenerator stage, with reference to the common potential (P), there is a negative output subvoltage ($U_{AII}$), the output subvoltages ($U_{AI}$) and ($U_{AII}$) added together producing said output voltage ($U_A$), the first and second regenerator stages, at the input sides, being connected to a DC or AC high voltage net of a board system power supply, said high voltage net having a transient voltages ($U_{TRANS}$) and oscillating at about 400 V–1500 V, the first and second regenerator stages, at the output sides, providing a ruled intermediate circuit voltage of about 600 V–750 V DC or 1000 V AC for supplying an electronic system, the first regenerator stage comprising a first shunt branch with a first inductance coil ($L_{LI}$), a first capacitor ($C_1$) and a first diode ($D_1$), an input terminal (PUE) being connected to a first junction of the first inductance coil ($L_{LI}$) and by way of a first input capacitor ($C_{EI}$) the with common potential (P), a first junction ($VS_1$) between the first inductance coil ($L_{LI}$) and the first capacitor ($C_1$) being connected by way of a first semiconductor switching device ($T_1$) with common potential (P), a second junction ($VS_{II}$) between the first capacitor ($C_1$) and an anode of the first diode ($D_1$) being connected by way of a first shunt inductance ($L_{Q1}$) with the common potential (P) and on the output side, a cathode of the first diode ($D_1$) is attached to an output terminal (PUA) which by way of a first connecting capacitor ($C_{AI}$) is connected with common potential (P), the second regenerator stage ($VT_{II}$) comprising a second shunt branch, in which a second inductance coil ($L_{LII}$), a second capacitor ($C_{II}$) and a second diode ($D_{II}$) are arranged and an input terminal (MUE) of the second regenerator stage ($SW_{II}$) is connected with a connection of the second inductance ($L_{LII}$) as well as with a first pole of a second input capacitor ($C_{EII}$), having second pole attached to the common potential (P), a third junction ($VS_3$) between the second inductance ($L_{LII}$) and the second capacitor ($C_{II}$) being attached to the common potential (P), a fourth junction (VS4) between the second capacitor ($C_{II}$) and an anode of the second diode ($D_{II}$) being connected to the common potential (P) via a second shunt inductance ($L_{QII}$), an anode of the second diode ($D_{II}$) being connected with a negative output (MUA) and a negative pole of a second output capacitor ($C_{II}$) having a positive pole connected with the common potential (P), and the output subvoltage ($UA_{II}$) being attached to the second output capacitor ($C_{AII}$) and a control unit (CU) being connected on the common potential (P), by means of which the first and the second semiconductor switching device ($T_I$, $T_{II}$) is controllable synchronously.

2. Voltage regenerator according to claim 1, wherein the inductance coils ($L_{LI}$, $L_{QI}$, $L_{LII}$, $L_{QII}$) are choking coils having a common magnetic core.

3. Voltage regenerator according to claim 1, wherein the voltage transformer (VT) comprises a control unit for potential-free activation of at least the semiconductor switching device ($T_{II}$).

4. Voltage regenerator according to claim 1, wherein the semiconductor switching devices ($T_I$, $T_{II}$) comprise IGBT or FET transistors.

5. Voltage regenerator according to claim 1, wherein on one shunt branch having the shunt inductance coils ($L_{QI}$, $L_{QII}$), a current measurement device ($IM_I$, $IM_{II}$) is provided, the measured current corresponding to the output current ($I_{AI}$, $I_{AII}$, $I_A$).

6. Voltage regenerator according to claim 1, wherein the control unit (CU) related to potential (P) by means of differential operational amplifiers measures the input voltage $U_E$ for $t_{on}$ pilot control.

7. Voltage regenerator according to claim 1, wherein the control unit (CU) related to potential P by means of differential operational amplifiers measures output voltage $U_A$ in terms of actual size.

8. Voltage regenerator according to claim 1, wherein as a result of differential measurement, potential (P) is not unsymmetrically loaded and when off-loading does not unsymmetrically become PUE/MUE.

9. Voltage regenerator according to claim 1, wherein by means of addition/subtraction of the shunt branch currents ($I_{AI}$, $I_{AII}$), a lack of symmetry in the regenerator stages ($VT_I$, $VT_{II}$) is ascertainable.

10. Voltage regenerator according to claim 1, wherein the regenerator stages ($VT_I$, $VT_{II}$) comprise at the output connections an isolation transformer stamped with the current.

* * * * *